April 30, 1929.  O. L. WEST ET AL  1,711,005
CLAMP FOR HOLDING WIRE LINE CABLES
Filed June 4, 1928
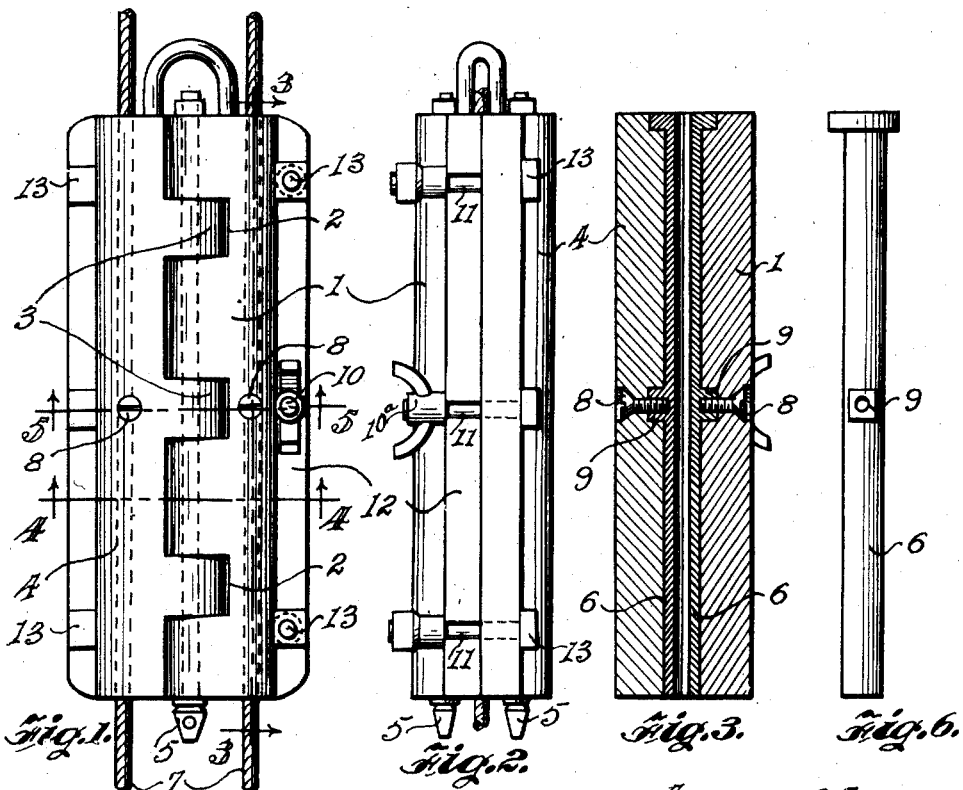
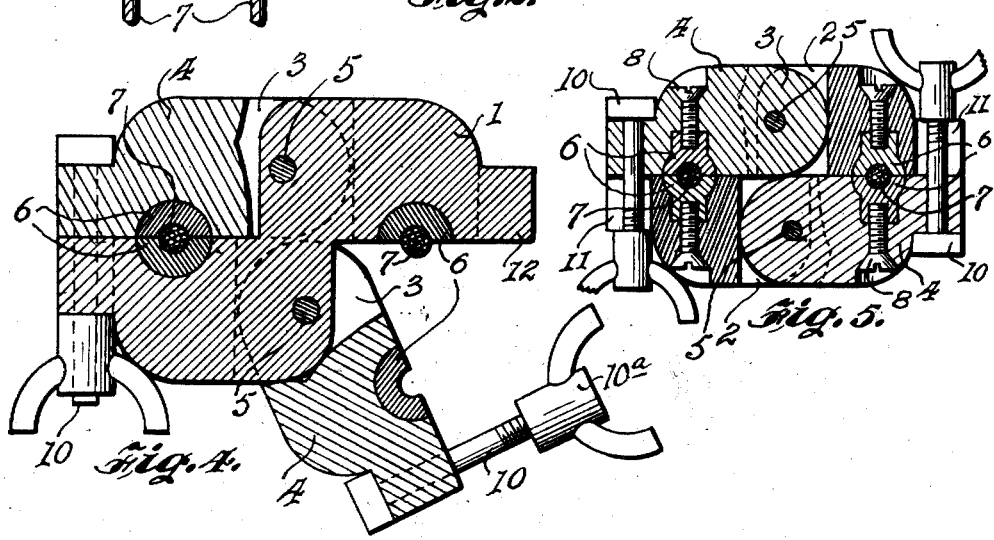
INVENTOR.
O. L. West,
C. W. Boland,
BY John W. Spellman
ATTORNEY.

Patented Apr. 30, 1929.

1,711,005

UNITED STATES PATENT OFFICE.

ORIE L. WEST AND CASSIE W. BOLAND, OF EARLSBORO, OKLAHOMA.

CLAMP FOR HOLDING WIRE-LINE CABLES.

Application filed June 4, 1928. Serial No. 282,586.

This invention relates to clamps for holding two wire line cables at one time and are commonly used in the drilling of oil wells, but in fact can be used at any place where it is necessary to hold securely one or two wire line cables.

One object of the invention is to eliminate the hazard of a slipping clamp, killing or crippling the operator as frequently occurs with the common wire line clamps now in use.

One other object of the invention is to prevent the destruction of wire cable, by providing a clamp with a long friction surface whereas the present clamps have a short friction surface that grips the cable insecurely and mashes the line out of shape, cutting the wire strands and causing them to break and kink which means annoyance to the operator and destruction to the line.

A still further object of the invention is to provide a clamp that is quick and positive in action thereby saving time for the operator and speeding up the handling of wire line cables in rig building or any place where such cables are in use. In fact this device is adapted to be used in connection with cables of any description, and will hold them securely and without injury to the cable or to the operator.

With these and other objects in view the invention consists of an improved cable clamp and in the arrangement of the several parts thereof, as herein set forth, and finally pointed out in the claims.

Referring to the accompanying drawings, in which similar characters of reference indicate corresponding parts in each of the several figures where they occur:

Figure 1 represents a front elevation view,

Figure 2 is a side elevation view,

Figure 3 is a vertical section taken on the line 3—3 of Figure 1,

Figure 4 is a transverse section taken on the line 4—4 of Figure 1 with one of the hinge or clamp members open, Figure 5 is a similar section but taken on the line 5—5 of Figure 1, and Figure 6 is a back elevation view of one of the cable slips.

The numeral 1 designates the body of the clamp, in which recesses 2 are cut to receive the ears 3 on the hinge members 4. A conjoined hole is drilled lengthwise through the body 1 and the ears 3 of the hinge members 4 to receive the hinge pins 5. The member 4 hinges on this pin permitting it to open and release the cable or close and clamp the cable as the case may be. The inner faces of the body 1 and members 4 have an annular groove extending their length to receive the cable slips 6 that hold and grip the cables 7. These slips are interchangeable for different sized cables and are held in place by the screws 8 that enter lugs 9 about midway of their length. A recess is provided in the channel of the groove along the face of the members 1 and 4 in which the lugs 9 are embedded to prevent the slips from moving lengthwise of the groove. Bolts 10 with wing nuts 10$^a$ are held by the members 4 and enter opposing slots 11 in the lips 12 of the member 1 and lock the members together after the cable has been inserted. Additional bolts 13 are provided to give greater strength when required but for ordinary use the wing nut bolts in the center are sufficient to grip and hold the cable securely.

The details of construction can be varied without departing from the spirit of my invention as set forth in the following claims:

We claim:

1. A two way heavy duty cable clamp, with a body member having two faces in direct alignment but opposed and reversed, said faces to be channeled to receive slips for holding and clamping a cable, a right angle portion connecting said faces and containing a plurality of recesses or slots for the purpose of receiving the ears of a hinge member, said recesses being connected by a drilled hole to receive a hinge pin, said body member having lips on its opposite and outer edges, said lips being provided with slots for receiving lock bolts, substantially as described.

2. A two way heavy duty cable clamp, with a body member as set forth in claim 1 and two hinge members, with a plurality of ears to fit in recesses in said body member, said body member and said ears to be drilled with a conjoined hole to receive a hinge pin for holding the members together in a hinged joint, said hinge members to have their inner faces channeled to receive slips for holding and clamping a cable, substantially as described.

In testimony whereof we affix our signatures.

ORIE L. WEST.
CASSIE W. BOLAND.